United States Patent [19]

Tanaka et al.

[11] Patent Number: 5,461,437
[45] Date of Patent: Oct. 24, 1995

[54] VIDEO TAPE RECORDER EQUIPPED WITH LIQUID CRYSTAL DISPLAY PROJECTOR

[75] Inventors: Sumio Tanaka; Yeong J. Joo, both of Tokyo, Japan

[73] Assignee: Goldstar Co., Ltd., Seoul, Rep. of Korea

[21] Appl. No.: 321,088

[22] Filed: Oct. 11, 1994

[30]  Foreign Application Priority Data

Oct. 14, 1993 [JP] Japan .................................. 5-256906

[51] Int. Cl.⁶ .................................................. G03B 21/10
[52] U.S. Cl. ................................................. 353/71; 353/77
[58] Field of Search ................................. 353/71, 74, 77, 353/72, 122; D14/135, 136; 360/85, 95

[56]  References Cited

U.S. PATENT DOCUMENTS

| | | | |
|---|---|---|---|
| 4,093,363 | 6/1978 | Prochnow | 353/71 |
| 4,572,632 | 2/1986 | Bodier et al. | 353/71 |
| 5,090,800 | 2/1992 | Ushiro | 353/119 |
| 5,235,362 | 8/1993 | Kioubauer | 353/71 |
| 5,343,262 | 8/1994 | Park | 353/119 |

*Primary Examiner*—William A. Cuchlinski, Jr.
*Assistant Examiner*—William C. Dowling

[57]  ABSTRACT

A VTR equipped with an LCD projector integral therewith, capable of eliminating the complexity of wirings and preventing degradation of video signals. The VTR includes a front screen, a rear screen disposed on a front panel of a VCR body and constructed to be openable and closable for the LCD projector projecting the image, a closing detecting unit for detecting an openable or closable state of the rear screen, an image inverting unit for laterally inverting a direction of the image to be projected onto the rear screen, the rear screen being opened when a viewer observes the image projected on the front screen, while being closed when the viewer observes the image projected on the rear screen, the detecting unit informing the image inverting means of the closed state of the rear screen, and the image inverting unit laterally inverting the image to be projected onto the rear screen upon receiving the information.

4 Claims, 6 Drawing Sheets

VIDEO TAPE RECORDER EQUIPPED WITH LIQUID CRYSTAL DISPLAY PROJECTOR

BACKGROUND OF THE INVENTION

1. Field of the Invention

The present invention relates to a combination of a projector using a liquid crystal display (LCD) and a video tape recorder (VTR), and more particularly to a VTR equipped with a color LCD projector.

2. Description of the Prior Art

Today, LCD projectors are widely used as application of LCDs. Since the cost per inch of a screen is high, an LCD projector for a large screen is very expensive. As a result, such an expensive large screen type LCD projector is mainly used only for business purposes. Moreover, most of large screen type LCD projectors have a fixed type construction, not a portable type, because they require a large lens size.

Mainly, compact LCD projectors of the portable type are commercially available. Such a compact LCD projector allows the user to view an image photographed by a video cassette recorder equipped with a camera integral therewith on a trip even when there is no TV by projecting the image onto a wall surface or a screen. Since the compact LCD projector uses a LCD having a size of 0.7 to 1 inch, it is convenient to be carried by the user.

FIG. 1 is a schematic view for explaining operation of an LCD projector. In FIG. 1, the reference numeral 1 denotes a projection lens, 2 an LCD panel, 3 a condensing lens, 4 a reflector, 5 a halogen lamp, and 8 a screen such as a wall surface. Liquid crystal does not emit light by itself and receives light from outside to display a video signal using a variation in reflectivity and transmittivity of a liquid crystal cell. The LCD projector achieves a picture reproduction using a projection of a pattern of light transmitting through the liquid crystal panel 2 on a front surface of the liquid crystal panel 2.

As shown in FIG. 1, light emerging from the halogen lamp 5 as a light source arranged in rear of the liquid crystal panel 2 is reflected by the reflector 4 and then introduced in the condensing lens 3 which, in turn, converts the received light into a parallel light. The reason why all of the light beams incident on the liquid crystal panel 2 are converted into the parallel light by the condensing lens 3 is because in the case of light other than the parallel light, the transmittivity thereof may be varied in the liquid crystal panel 2.

The parallel light incident on the liquid crystal panel 2 is then subjected to a spatial modulation appropriate to video signals. The light which has been subjected to the spatial modulation then enters the projection lens 1 which, in turn, projects the light onto the screen 8 arranged in front of the projection lens 1, so that a picture is displayed.

FIG. 2 is a perspective view of the appearance of the LCD projector having the arrangement of FIG. 1. In FIG. 2, the reference numeral 1 denotes the projection lens shown in FIG. 1, 7 a focusing ring, and 10 a cassette insertion/extraction opening of a VTR. The LCD projector of the illustrated type is commercially available in the form of a single product to be used as an exclusive unit for the projection.

As shown in FIG. 2, various wirings such as couplings and power supply lines are connected between the LCD projector and the VTR. When such wirings are reduced in number, a convenience in use is improved. On the contrary, where the wirings are increased in number or in length; a degradation of video signals may easily occur due to generation of noise. In the latter case, processes of separating and composing video signals between the appliances are increased in number, thereby causing the signals to be easily degraded.

On the other hand, a compact LCD projector is frequently used for reproduction of VTR. In this case, the LCD projector should have wirings for video signals to be supplied from the VTR. Wirings for audio signals and electric power should be also provided. As a result, the above case encounters the complexity of wirings. Where the LCD projector is integral with the VTR in order to eliminate the complexity of wirings, a convenience in use is obtained.

SUMMARY OF THE INVENTION

Therefore, an object of the invention is to solve the above-mentioned problems encountered in the prior art and thus, to provide a VTR equipped with an LCD projector integral therewith, capable of eliminating the complexity of wirings and preventing degradation of video signals.

In accordance with one aspect, the present invention provides a video tape recorder equipped with a liquid crystal display projector for projecting an image onto a front screen such as a wall surface, comprising: a rear screen disposed on a front panel of a body of the video tape recorder and constructed to be openable and closable for the liquid crystal display projector projecting the image; detecting means for detecting an openable or closable state of the rear screen; image inverting means for laterally inverting a direction of the image to be projected onto the rear screen; the rear screen being opened when a viewer observes the image projected on the front screen, while being closed when the viewer observes the image projected on the rear screen; the detecting means informing the image inverting means of the closed state of the rear screen; and the image inverting means laterally inverting the image to be projected onto the rear screen upon receiving the information.

The image inverting means is adapted to inversely scan a string of pulses for driving a liquid crystal display panel and thereby obtain an inverted image.

In accordance with another aspect, the present invention provides a video tape recorder equipped with a liquid crystal display projector for projecting an image onto a front screen such as a wall surface, comprising: a rear screen disposed on a top panel of a body of the video tape recorder and constructed for the liquid crystal display projector projecting the image; reflection means for projecting the image onto the rear screen, the reflection means being movable between a laid-down position and a stand-up position; and the reflection means allowing the image to be projected onto the front screen by the movement thereof to the laid-down position when a viewer desires to observe the image projected onto the front screen, while allowing the image to be projected onto the rear screen by the movement thereof to the stand-up position when the viewer desires to observe the image projected onto the rear screen.

The reflection means comprises a plane mirror and a pivot shaft for pivoting the plane mirror.

BRIEF DESCRIPTION OF THE DRAWINGS

Other objects and aspects of the invention will become apparent from the following description of embodiments with reference to the accompanying drawings in which:

FIG. 1 is a schematic view for explaining operation of an

Figure 1:
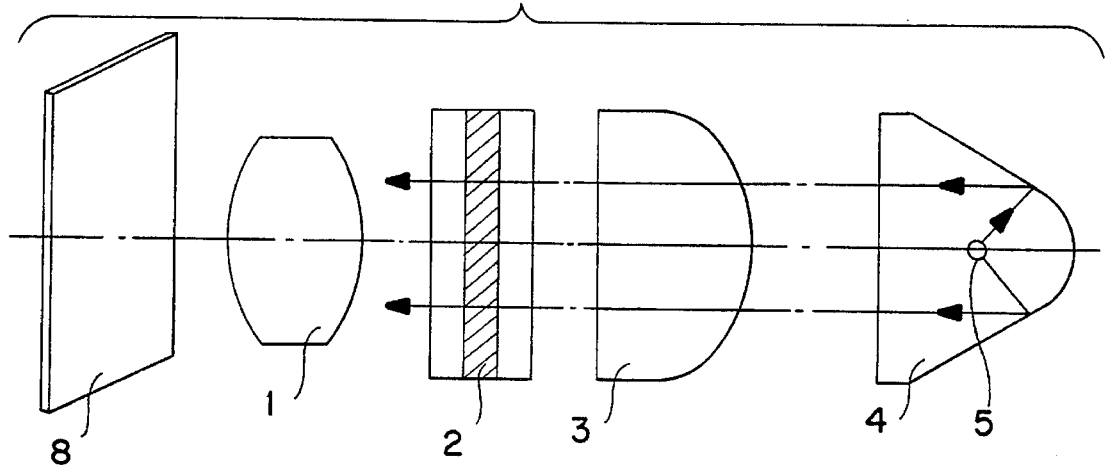
Figure 2:
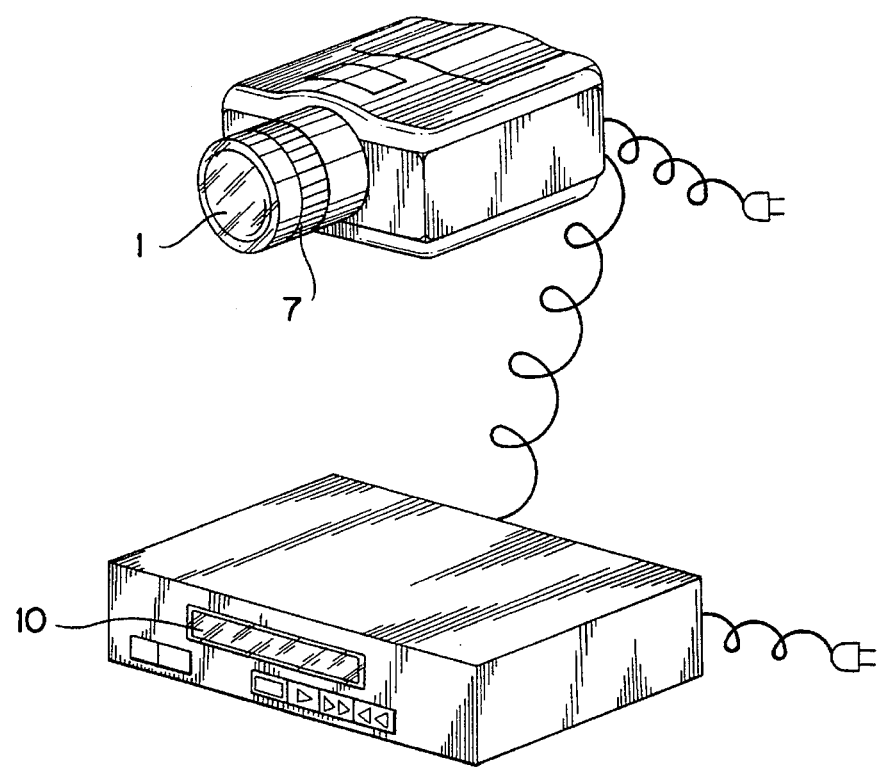
Figure 3:
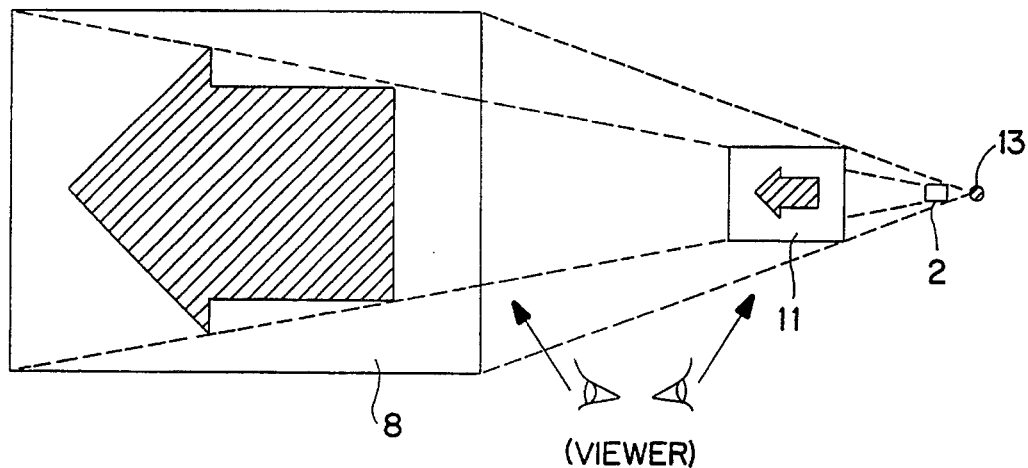
Figure 4:
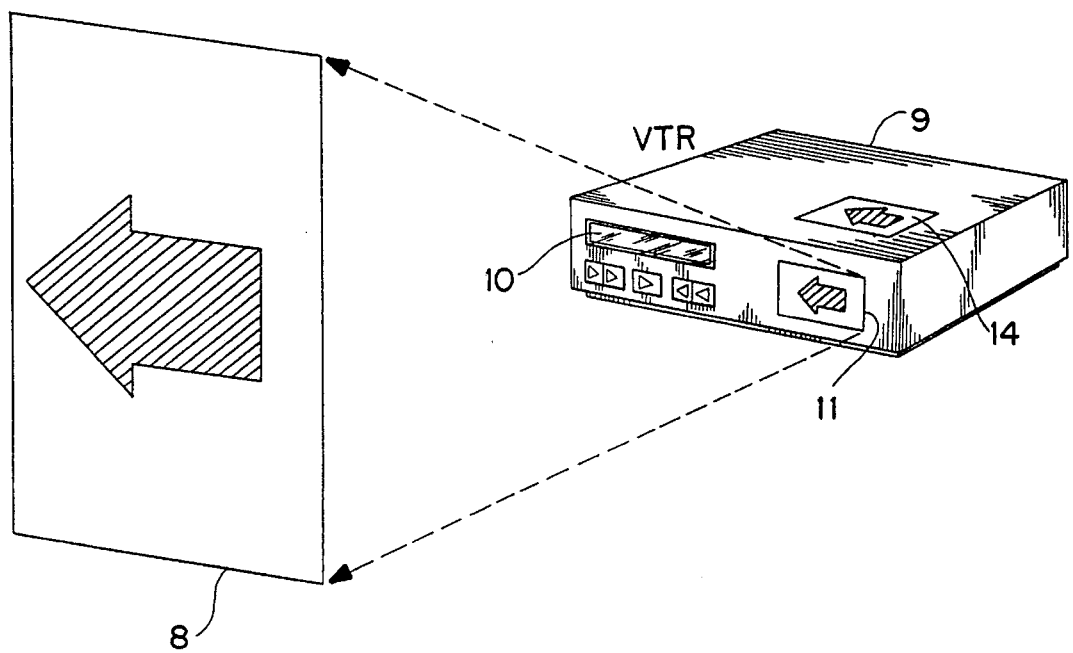
Figure 5:
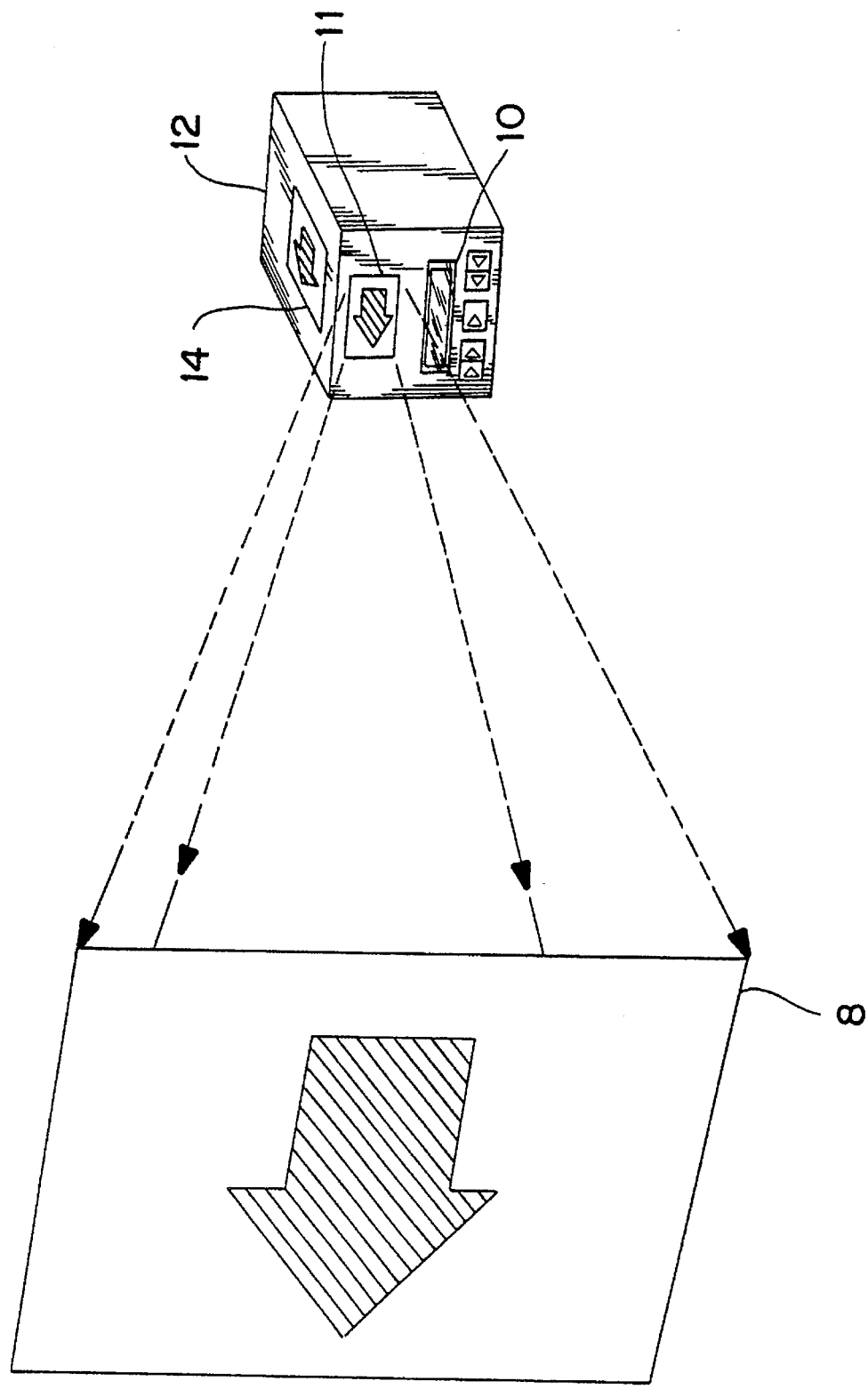
Figure 6:
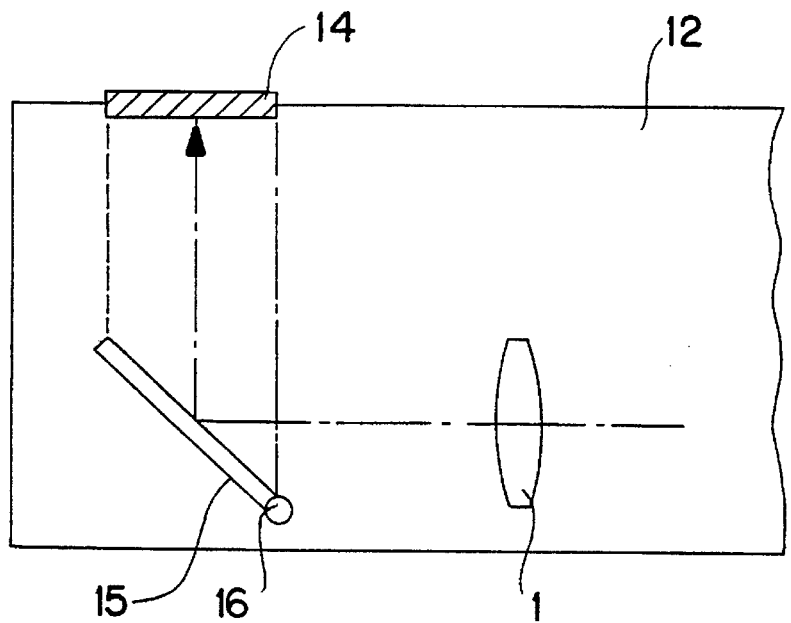
Figure 6:
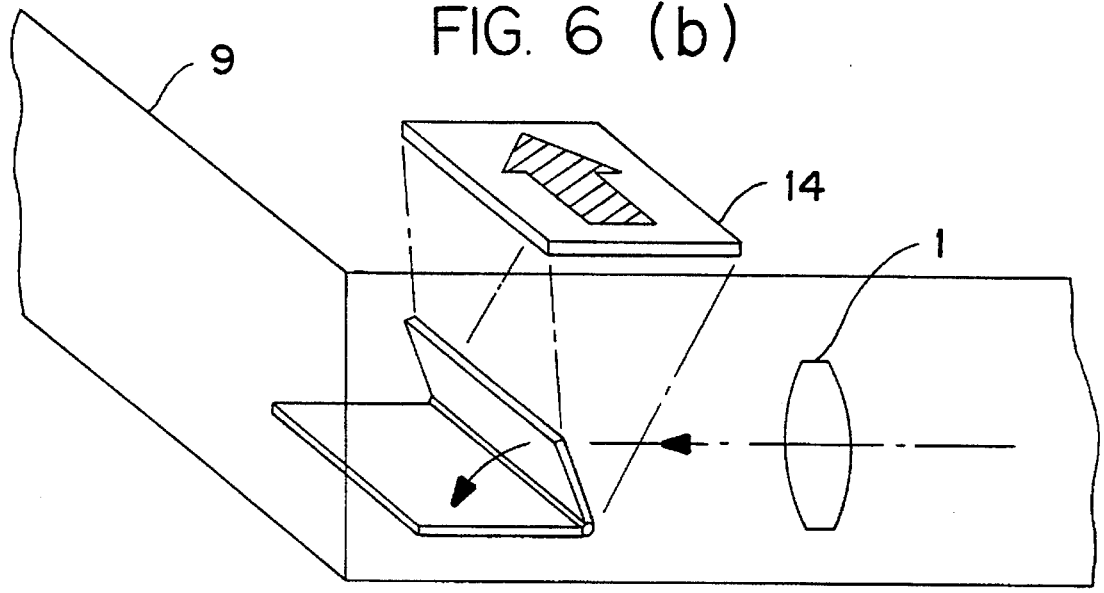
Figure 7:
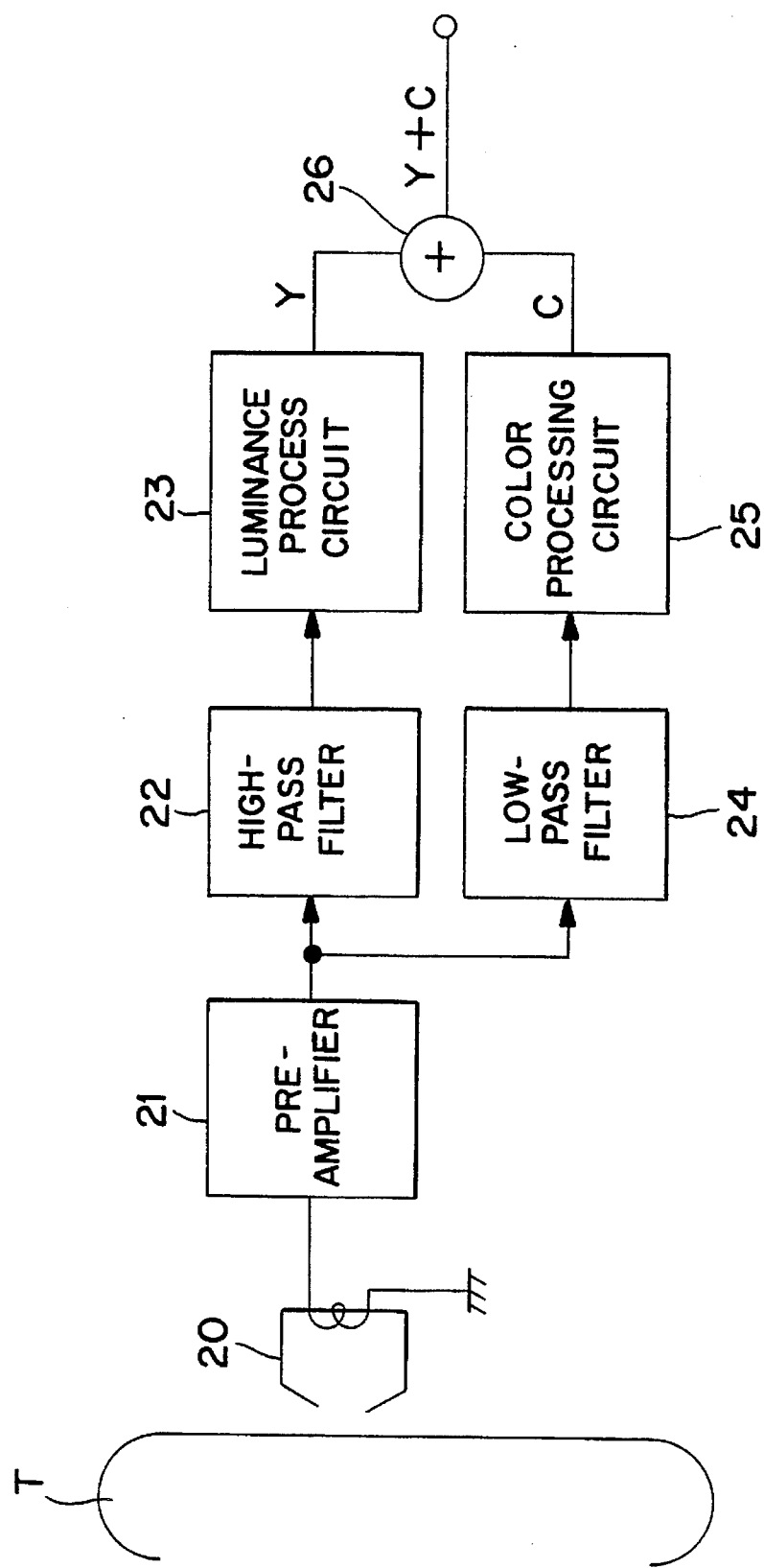
Figure 8:
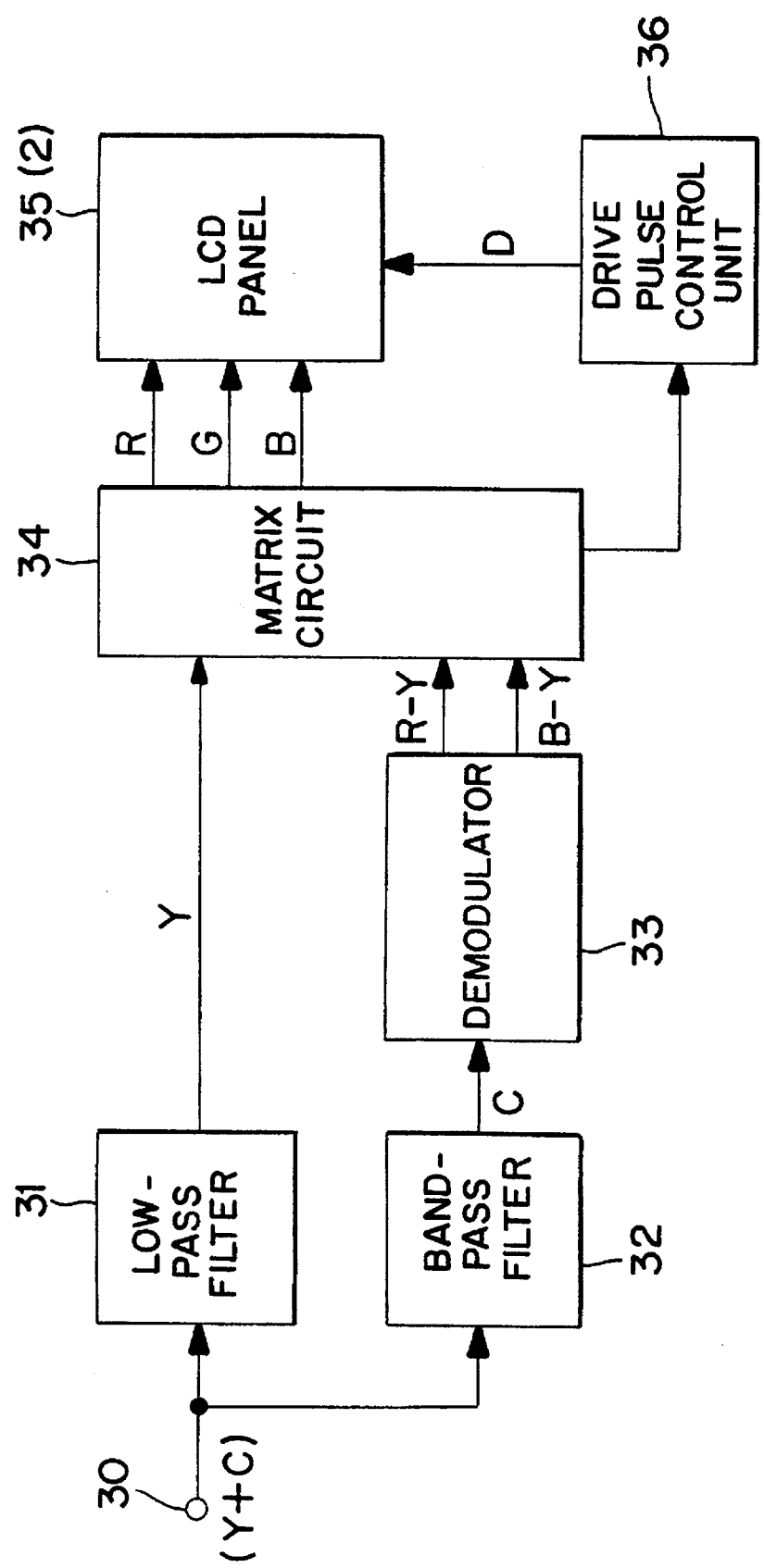

LCD projector;

FIG. 2 is a perspective view of the appearance of the LCD projector having the arrangement of FIG. 1;

FIG. 3 is a schematic view explaining the basic concept of the present invention where an LCD projector is integral with a VTR;

FIG. 4 is a perspective view illustrating a fixed type VTR equipped with the LCD projector integral therewith in accordance with the present invention;

FIG. 5 is a perspective view illustrating a potable type VTR equipped with the LCD projector integral therewith in accordance with the present invention;

FIGS. 6A and 6B are a schematic sectional view and a schematic perspective view respectively illustrating the case wherein the second rear screen is used;

FIG. 7 is a block diagram of a reproduction circuit equipped in either type of VTR; and FIG. 8 is a block diagram of the LCD driving unit equipped in either type of VTR,

DETAILED DESCRIPTION OF THE PREFERRED EMBODIMENTS

FIG. 3 is a schematic view explaining the basic concept of the present invention where an LCD projector is integral with a VTR. In FIG. 3, the reference numeral 2 denotes an LCD panel, 8 a front screen, 11 a first rear screen installed in the VTR, and 13 a condensing lens including a light source.

Where the LCD projector is integral with the VTR in accordance with the present invention, the condensing lens 13, LCD panel 2 and first rear screen 11 are installed in the VTR. A projection lens 1 (FIGS. 6A and 6B) is also installed in the VTR.

In FIG. 3, the image projected onto the front screen 8 is depicted in the form of an arrow so as to clearly illustrate the lateral inversion between the image on the front screen 8 and the image on the first rear screen 11 both viewed by a viewer who is positioned between the front screen 8 and the first rear screen 11. For example, where the VTR operates to reproduce video signals in a confined room such as the interior of a car, the viewer can view a reproduced image projected onto the first rear screen 11 disposed on a front panel of the VTR or a second rear screen 14 disposed on a top panel of the VTR. In this case, the arrow of the image viewed by the viewer is opposite in direction to that of the image on the front screen 8 Viewed by the viewer in accordance with the present invention.

Such a lateral image inversion between the first rear screen 11 and the front screen 8 is easily achieved by a lateral image inversion function of an LCD driving unit which will be described hereinafter.

Where the second rear screen 14 installed on the top panel of the VTR, the image inversion may be achieved by a In accordance with the present invention, the first rear screen 11 is constructed to move between an opened position and a closed position so that it can meet the construction of the LCD projector integral with the VTR. When the viewer desires to view an image projected onto the front screen 8 such as a wall surface, the first rear screen 11 is positioned at its opened position so that light can be directly projected on the screen 8. On the other hand, when the viewer desires to view an image projected onto the panel of VTR, the first rear screen 11 is positioned at its closed position so that light can be projected on the screen 11. In this case, a lateral image inversion is obtained in a manner as mentioned above. To this end, the closing of the first rear screen 11 is detected by a closing detecting unit. When the closing detecting unit detects the closed state of the first rear screen 11, it generates a lateral image inversion signal to the LCD driving unit so as to achieve an automatic lateral image inversion.

FIG. 4 is a perspective view illustrating a fixed type VTR equipped with the LCD projector integral therewith in accordance with the present invention. FIG. 5 is a perspective view illustrating a potable type VTR equipped with the LCD projector integral therewith in accordance with the present invention. FIGS. 6A and 6B are a schematic sectional view and a schematic perspective view respectively illustrating the case wherein the second rear screen is used. FIG. 7 is a block diagram of a reproduction circuit equipped in either type of VTR. FIG. 8 is a block diagram of the LCD driving unit equipped in either type of VTR.

In FIG. 4, the reference numeral denotes the fixed type VTR equipped with the LCD projector, 10 an insertion/extraction opening for a video tape cassette, 11 the first rear screen, and 14 the second rear screen. The viewer can select optionally one of the first rear screen 11, the second rear screen 14 and the front screen 8 to view an image projected onto the selected screen.

Where the viewer observes the front screen 8, the plane mirror 15 is positioned at its horizontal position, as shown in FIG. 6B. In this case, the first rear screen 11 is also positioned at its opened position. On the other hand, where the viewer observes the first rear screen 11, the first rear screen 11 is positioned at its closed position under the condition that the plane mirror 15 is positioned at its horizontal position. In this case, the lateral image inversion is achieved by an image inverting unit.

In FIG. 5, the reference numeral 12 denotes the potable type VTR equipped with the LCD projector integral therewith The VTR shown in FIG. 5 has the same construction as that shown in FIG. 4, except that it is designed to have a compact size. Therefore, no description of the potable type VTR will be made.

FIGS. 6A and 6B show an inner construction of the VTR of FIG. 4 or 5 including the second rear screen disposed on a top panel of a VTR body. In FIGS. 6A and 6B, the reference numeral 1 denotes the projection lens, 15 the plane mirror, and 16 a pivot shaft of the plane mirror 15. The plane mirror 15 and the pivot shaft 16 constitute a reflection unit. As shown in FIGS. 6A and 6B, the plane mirror 15 is disposed in front of the projection lens 1 such that it can pivot about the pivot shaft 16. As the reflection angle of the plane mirror 15 is adjusted to reflect light beams emerging from the projection lens 1 such that the light beams are vertically projected onto the second rear screen 14, the viewer can view a small-sized picture displayed on the top panel of the VTR body. Where the viewer desires to view a picture displayed on the front screen 8, the plane mirror 15 is laid down in the direction indicated by the arrow in FIG. 6B. As a result, the image emerging from the projection lens 1 is projected onto the front screen 8. Although the case using the first rear screen requires the image inverting unit for reversing the scanning direction of the LCD panel, the case of FIGS. 6A and 6B using the second rear screen installed on the top panel of the VCR body has an advantage that the image inversion performed in the LCD driving unit is not required. This is because the plane mirror 15 constituting a part of the image reflection unit inverts the image laterally.

In FIG. 7, the reference character T denotes a magnetic tape, while the reference numeral 20 denotes a magnetic head, 21 a pre-amplifier, 22 a high-pass filter, 23 a luminance signal processing circuit, 24 a low-pass filter, 25 a color signal processing circuit, and 26 an adder. As shown in FIG. 7, a video signal recorded on the magnetic tape T is converted into an electrical signal by the magnetic head 20 and the pre-amplifier 21 in a reproduction operation of the VTR. The electrical signal is then sent to both the high-pass filter 22 and the low-pass filter 23 which extract a FM luminance signal and a low-band-converted color signal from the received signal, respectively. The FM luminance signal and the color signal are then converted into an original luminance signal Y and an original color signal C in the luminance signal processing circuit 23 and the color signal processing circuit 25, respectively. Both the recovered luminance signal Y and the recovered color signal C are sent to the adder 26 which, in turn, generates a composite video signal Y+C.

In FIG. 8, the unit for driving the LCD panel 35 is shown. As shown in FIG. 8, the LCD driving unit includes a terminal 30 for receiving the composite video signal Y+C from the adder 26, and a drive pulse control unit 36 for generating a drive pulse D made from the composite video signal Y+C. In FIG. 8, the reference numeral 31 denotes a low-pass filter, 32 a band-pass filter, 33 a demodulator, and 34 a matrix circuit for composing signals received thereto.

The drive pulse control unit 36 makes R, G and B signals made from the composite video signal Y+C correspond to R, G and B pixels of the LCD panle 35 (corresponding to the element denoted by the reference numeral 2 in FIG. 1) by generating drive pulses corresponding to the pixels, respectively. The drive pulse control unit 36 also varies the transmittivity of the LCD panel, based on the video signal. As mentioned above, the lateral image inversion is made between the first rear screen 11 and the front screen 8. This image inversion is achieved by inverting a string of pulses driving the LCD.

As described above, in the conventional case, the LCD projector and the VTR are separated from each other, thereby requiring a wiring for connecting them with each other. In accordance with the present invention, however, the LCD projector is integral with the VTR. By this construction of the present invention, the luminance-processing output ann color-processing output of the VTR can be directly connected to the output of the low-pass filter 31 and band-pass filter 32 of the LCD projector, respectively. This means no requirement of any outer wiring. In accordance with the construction of the present invention, there is no required any filter for separating Y and C signals, which filter is required in the conventional LCD driving unit. As a result, it is possible to prevent a degradation of video signals caused by the separation processing.

Although not shown in FIGS. 4 and 5, the VTR of the present invention has an audio speaker and a headphone terminal. A focusing ring for the LCD projector is also provided.

As apparent from the above description, the present invention provides a VTR equipped with an LCD projector integral therewith, capable of simplifying its wiring including signal lines and power supply lines. Since a rear screen is installed on a front panel of the VTR in accordance with the present invention, the VTR can be used to achieve a small-sized image display. Furthermore, since the rear screen is constructed to be openable and closable, it is possible to project an image onto a large screen such as a wall surface. Accordingly, the value of using the LCD projector is greatly enhanced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A video tape recorder equipped with a liquid crystal display projector for projecting an image onto a front screen such as a wall surface, comprising:

a rear screen disposed on a front panel of a body of the video tape recorder and constructed to be openable and the image;

detecting means for detecting an openable or closable state of the rear screen;

image inverting means for laterally inverting a direction of the image to be projected onto the rear screen;

the rear screen being opened when a viewer observes the image projected on the front screen, while being closed when the viewer observes the image projected on the rear screen;

the detecting means informing the image inverting means of the closed state of the rear screen; and the image inverting means laterally inverting the image to be projected onto the rear screen upon receiving the information.

2. The video tape recorder in accordance with claim 1, wherein the image inverting means is adapted to inversely scan a string of pulses for driving a liquid crystal display panel and thereby obtain an inverted image.

3. A video tape recorder equipped with a liquid crystal display projector for projecting an image onto a front screen such as a wall surface, comprising:

a rear screen disposed on a top panel of a body of the video tape recorder and constructed for the liquid crystal display projector projecting the image;

reflection means for projecting the image onto the rear screen, the reflection means being movable between a laid-down position and a stand-up position; and the reflection means allowing the image to be projected onto the front screen by the movement thereof to the laid-down position when a viewer desires to observe the image projected onto the front screen, while allowing the image to be projected onto the rear screen by the movement thereof to the stand-up position when the viewer desires to observe the image projected onto the rear screen.

4. The video tape recorder in accordance with claim 3, wherein the reflection means comprises a plane mirror and a pivot shaft for pivoting the plane mirror.

\* \* \* \* \*